June 3, 1969          H. G. MEUNIER          3,448,375

PROCESS FOR CONTINUOUSLY MEASURING THE QUALITY OF AN AGGLOMERATE

Filed March 23, 1967

United States Patent Office 3,448,375
Patented June 3, 1969

3,448,375
PROCESS FOR CONTINUOUSLY MEASURING THE QUALITY OF AN AGGLOMERATE
Henri Gilbert Meunier, Liege, Belgium, assignor to Centre National de Recherches Metallurgiques, Brussels, Belgium, a Belgian company
Filed Mar. 23, 1967, Ser. No. 625,553
Claims priority, application Luxembourg, Mar. 25, 1966, 50,769
Int. Cl. G01r 33/12
U.S. Cl. 324—34                                 2 Claims

ABSTRACT OF THE DISCLOSURE

A process for continuously measuring the cohesive strength of agglomerates, such as iron ore sinter, wherein a sample of sinter is used as the inductive core of a coil and the inductance of the coil is continuously measured, e.g., by determining the resonant frequency of a tuned circuit including the coil, which inductance is characteristic of the cohesive strength of the agglomerate.

---

Figure 1:
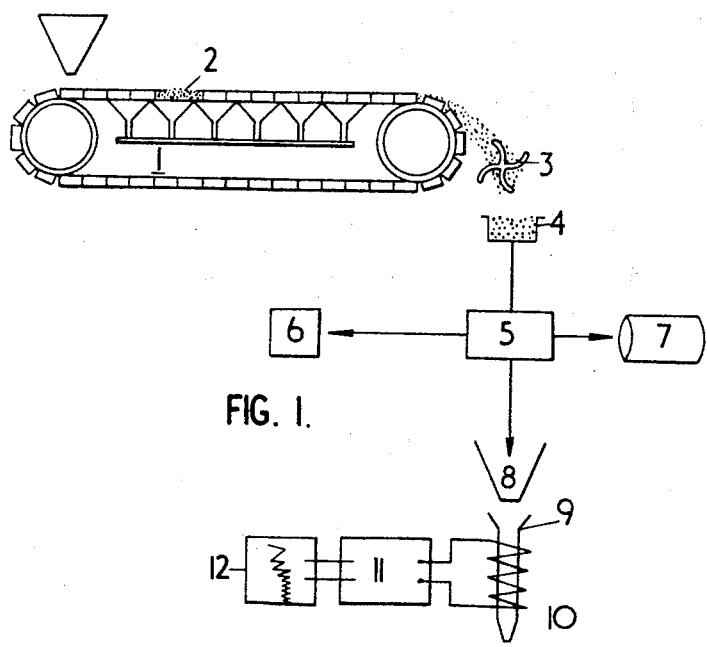

The present invention relates to a process for continuously measuring the quality of an agglomerate, particularly a sintered agglomerate, of mineral substances, and particularly, but not solely, of an agglomerate of iron ores.

Knowledge of the quality of an agglomerate, available at all times, is of great utility in controlling agglomeration processes, such as sintering processes on a belt or grid, and although this specific problem has been somewhat neglected for many years, in favour of technological improvements, this was no doubt due to lack of data regarding the sintering process itself, the consequences it is likely to have in the operation of blast furnaces, and to the absence of industrially useful measuring devices.

The breakdown of the agglomerate under attrition has been taken to characterise the cohesive quality of the said agglomerates. It may be recalled that one of the test methods, namely the Micum test, is carried out in the following manner.

A specimen of approximately 15 kg. (33 lbs.), whose pieces vary in size between approximately 10 mm. (0.4 inch) and approximately 40 mm. (1.6 inches), is taken from the agglomerate fraction whose pieces exceed approximately 10 mm. (0.4 inch) in size, the said specimen being fed into a rotary drum having a diameter of approximately 1 metre (39.3 inches) and a width of approximately 25 cm. (10 inches). This drum is rotated for a definite period at a speed of 25 revolutions per minute. The said specimen is thereupon removed from the drum, passed through a screen with a mesh size of approximately 5 mm. (0.2 inch), and the total weight of pieces of a size of between 0 and 5 mm. (0.2 inch) is determined.

This method is onerous due to the need for determining the size of the pieces before and after testing, so that very careful screening and weighing operations are necessary.

The operation of the testing drums is intermittent in practice, owing to these two concurrent needs.

A much more recent method for determining cohesion consists of performing molecular analysis of the agglomerates, which renders it possible to separate the iron into its different true states: hematite, magnetite, so-called "wüstite" and ferrites (the last term covering various combinations of iron, lime, silica and alumina), each playing a part in overall strength or cohesion.

Although very useful, this method nevertheless has the disadvantage of requiring long preparation of the sample which must be crushed very finely in a controlled manner, and moreover merely gives intermittent results based on samples of low weight, whose representative nature can be ensured only by careful sampling.

The present invention, which has as its basis that the iron compounds cited hereinabove possess different magnetic properties, has as its object the provision of a process which not only renders it possible to eliminate these shortcomings, but in addition renders it possible to gain knoweldge in continuous manner of the quality of the agglomerate, which represents a valuable contribution to the automation of the agglomeration process.

In the process forming the subject of the present invention, a definite quantity of agglomerate is sampled in a continuous manner, and the sample is inserted into a solenoid, thus forming a core whose magnetic properties depend on the cohesive strength of the agglomerate, and the inductance of the solenoid is measured continually by means of a device known per se, this measurement providing a characteristic reading of the value of the cohesive strength of the said agglomerate.

The inductance of the solenoid is advantageously measured by measuring the frequency of a resonating circuit containing the said solenoid.

The invention will now be described with reference to the accompanying drawings, which show one embodiment of the invention, but in no restrictive sense.

Figure 2:
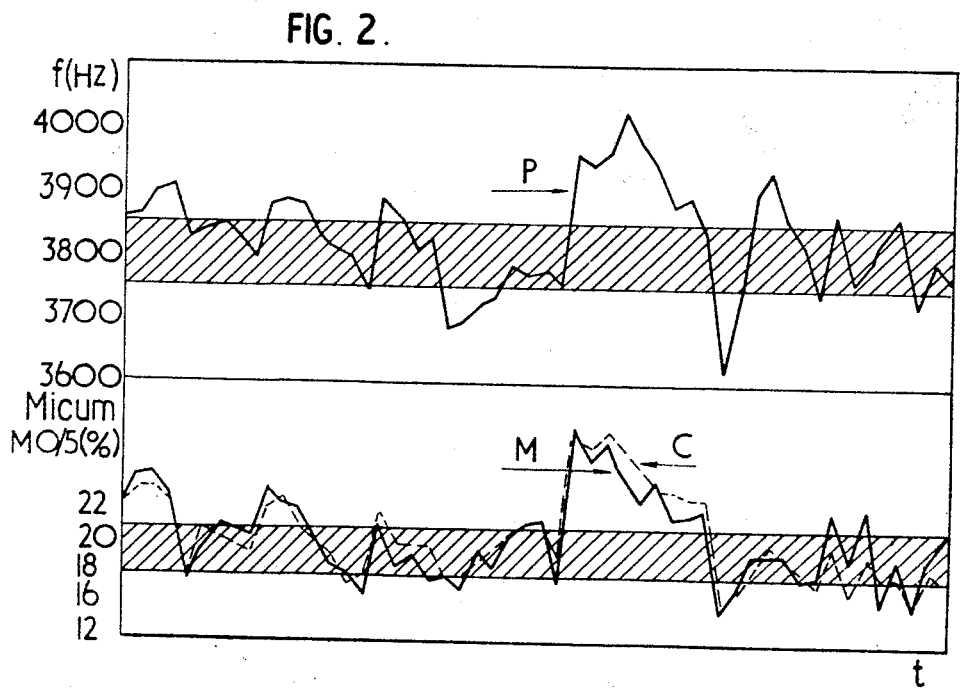

In the drawings:

FIGURE 1 is a diagrammatic illustration of an arrangement for agglomerate processing, including the continuous measuring process forming the object of the present invention, and FIGURE 2 consists of showing the results obtained for an agglomeration line in industrial operation.

During the operation of the plant, tests were performed on agglomerates in order to compare the results obtained by the method according to the invention, with the results obtained by means of two other methods, being the two methods already described, that is that employing the Micum drum and that employing molecular analysis. Since these last two methods are essentially intermittent, samples had to be taken intermittently for comparison purposes, although the process forming the object of the invention is applicable in continuous manner. Any adjustment in production based on test results was eschewed moreover, in order to obtain the greatest possible differences in measurements.

With reference to FIGURE 1, on leaving the sinter belt 1, a certain proportion of iron ore sinter 2 previously broken up and screened in mechanisms 3 which are known per se, is sampled in such manner as to provide a specimen 4 every quarter of an hour. This specimen was prepared in a device 5 in a manner suitable for subsequent treatment and was divided into three fractions, one being intended for molecular analysis in apparatus 6, the second being intended for testing by means of the Micum drum 7, and the third finally being conveyed to the devices applying the process forming the object of the invention and comprising a feed hopper 8, a tube 9 traversed by the substance of the specimen, and a solenoid 10 connected to a frequency meter oscillator 11 followed by a recording mechanism 12.

Spread over a week, the diagrams of FIGURE 2 show:
— at M, the evolution of the Micum values measured, expressed by the M 0 to 5 mm. proportion as a percentage of the 0 to 5 mm. granulometric fraction produced in a test in the drum under standard conditions, — at C, the same values calculated according to statistical relationships from the proportions established by molecular analysis, — at P, the resonance frequency $f$ of the magnetic circuit incorporating the solenoid.

The time $t$ is plotted as the abscissa in these diagrams, whereas the ordinates represent either the frequency $f$, or the M 0 to 5 mm. proportion of agglomerates of 0 to 5 mm. granulometry.

On each of the diagrams, the hatched area corresponds to the desirable cohesion of the agglomerate. Outside these areas, the agglomerate produced is too hard or too crumbly. It is observed that the readings obtained by the process forming the subject of the invention correspond closely to those given by the drum.

By means of the process described hereinabove, a knowledge of the cohesive strength of an agglomerate may be acquired continuously during its production, so that the operative in charge is alerted immediately to the need for any adjustments.

I claim:
1. A process for continuously measuring the cohesive strength of an agglomerate, comprising the steps of:
  (a) continuously sampling the agglomerate,
  (b) passing the sampled agglomerate into a solenoid so as to form at least part of a core, the magnetic properties of which are related to the cohesive strength of the agglomerate, and
  (c) continuously assessing the inductance of the solenoid, and relating said inductance to the cohesive strength of the agglomerate.
2. A process as claimed in claim 1 in which the inductance of the solenoid is measured by determining the resonance frequency of a resonating circuit incorporating the solenoid.

References Cited

UNITED STATES PATENTS 2,576,173  11/1951  Cornelius _____ 324—34
2,696,588  12/1954  Criner _____ 324—40

RUDOLPH V. ROLINEC, Primary Examiner.

A. E. SMITH, Assistant Examiner.

U.S. Cl. X.R
324—41